United States Patent [19]

Ryburn et al.

[11] 3,778,115

[45] Dec. 11, 1973

[54] PNEUMATIC BRAKE SYSTEM

[75] Inventors: Kenneth D. Ryburn, Chillicothe; Robert J. McClone; Charles H. Fox, both of Washington, all of Ill.

[73] Assignee: Westinghouse Air Brake Company, Pittsburgh, Pa.

[22] Filed: June 8, 1972

[21] Appl. No.: 261,120

Related U.S. Application Data

[62] Division of Ser. No. 108,579, Jan. 21, 1971, Pat. No. 3,702,715.

[52] U.S. Cl. ................................. 303/3, 188/159
[51] Int. Cl. ..................... B60l 7/00, B60t 17/04
[58] Field of Search ................... 303/3, 15, 16, 20; 188/159; 192/2

[56] References Cited
UNITED STATES PATENTS 3,621,929  11/1971  Oberthur ............................... 303/3
3,486,799  12/1969  Greentree ............................... 303/3

*Primary Examiner*—Duane A. Reger
*Assistant Examiner*—D. C. Butler
*Attorney*—Robert J. Eck

[57] ABSTRACT

A pneumatic brake system for an electrically driven vehicle having conventional service and novel parking brakes, which system integrates a service braking system, a dynamic braking system, an emergency braking system, and a parking braking system for selective and automatic application. The dynamic and service brakes are controlled by a brake application valve having a foot treadle adapted for engagement by the vehicle operator and connected in tandem with service and dynamic braking valves so that upon initial engagement of said treadle dynamic braking is effected and upon further engagement service braking is effected. The emergency brake system is operated automatically through the use of emergency relay valves upon attainment of a predetermined air pressure within the brake system and includes a brake reapplication system which may be employed to release and then reapply the service brakes after an emergency braking conditions. The parking brake is of the spring operated, air pressure released type and is adapted for independent application by a manual control valve disposed within the parking brake line.

7 Claims, 7 Drawing Figures

PATENTED DEC 11 1973 3,778,115

PNEUMATIC BRAKE SYSTEM

This is a division of application Ser. No. 108,579, filed Jan. 21, 1971, now U.S. Pat. No. 3,702,775.

BACKGROUND AND SUMMARY OF THE INVENTION

The present invention relates in general to a pneumatic brake system for an electrically driven vehicle and, more particularly, to a combination service-dynamic, emergency, and parking brake system therefor.

Heretofore, electrically driven vehicles were not equipped with a parking brake. Therefore, the vehicle had to be parked on a flat surface, or restrained, as by blocks, if parked on a sloping surface. More recently, S.A.E. specifications require that all electrically driven vehicles must be equipped with a parking brake which is sufficient to permit parking of the vehicle on a 15 percent grade.

Moreover, conventional electrically driven vehicles incorporate separate controls for initiating dynamic and service braking of the vehicle. Such separate controls demand a more concentrated effort by a vehicle operator during braking. Additionally, because of the separate controls, oftentimes the service brakes would be operated independently of the dynamic brakes, thereby causing greater wear of the service brakes.

Additionally, some present day vehicles which incorporate a pneumatic brake system are not furnished with a suitable auxiliary or emergency braking system for assuring automatic application of the service brakes in an emergency situation, such as, when the vehicle loses its air pressure. Even in vehicles that do contain an emergency braking system, such system is inadequate because once the brakes are applied they may not be released until the condition causing the emergency situation has been alleviated and the air pressure within the overall system has been elevated to the desired level. Thus, once the brakes of a vehicle have been so applied, the vehicle could not be moved for even a short distance. Therefore, if a vehicle was incapacitated on a heavily traveled roadway, or in a remote area, considerable inconvenience and loss of time would result because the situation resulting in the emergency braking condition would have to be repaired before the vehicle could be moved. Additionally, in an emergency situation, the emergency braking system of present day vehicles automatically applies the service brake with a relatively great surge of pressure, resulting in the undesirable skidding and sliding of the vehicle wheels.

Furthermore, in conventional vehicles it is possible for an operator to engage the vehicle throttle for effecting acceleration while the brakes are in an applied, or partially applied, condition thereby causing greater wear, and reducing the overall life of the brakes.

The present invention alleviates all the above disadvantages by providing a novel safety and parking brake, including a brake drum fixed on the motor armature and a brake assembly mounted on the electrical traction motor with an air released, spring applied brake actuator for alternatively engaging and disengaging brake assembly with the brake drum responsive to air pressure. The size and position of the parking brake relative to the traction motor is such that access to the armature brushes may be readily and easily provided at all times. Said parking brake also meets the S.A.E. specifications in that it achieves requisite braking action to sustain a vehicle on a slope in excess of 15 percent.

Moreover, the braking system of the present invention utilizes a brake application valve having a foot-operated brake treadle which is connected in tandem to a dynamic braking valve and a service braking valve for supplying air pressure through the respective dynamic and service brake lines. The service braking valve remains closed until the brake treadle has been depressed approximately one-half its total distance thereby assuring that the dynamic brakes of the vehicle will be fully utilized prior to the application of the service brakes. Thus, in the usual situation where a brake treadle is slowly depressed, the dynamic brakes will change the traction motor into a generator for slowing the vehicle down, and upon further depression of the brake treadle the service brakes will be applied thereby fully using the dynamic brakes to enhance the life span of the service brakes.

Another advantage of the present invention is the provision of a novel emergency braking system which utilizes a plurality of auxiliary or emergency tanks for maintaining a reserve supply of air and a plurality of emergency relay valves interconnected by an emergency air line which cooperate for applying the service brakes when the air pressure within the emergency line is reduced below a predetermined level, as in a situation where the braking system main line has ruptured. Moreover, the emergency braking system includes a reapplication reservoir which is connected to the emergency line by a manually operated brake reapplication valve which may be engaged by the operator for sending air from the reapplication reservoir through the emergency line for releasing the service brakes. The brake reapplication valve is controlled by a button which, when engaged, establishes communication between the reapplication air reservoir and the service brakes and blocks communication with the main line for supplying sufficient air pressure or release the brakes so that the vehicle will be permitted to move; and when released, exhausts the emergency line for effecting reapplication of the service brakes. By such reapplication system, the emergency applied service brakes may be released and reapplied so that the vehicle may be moved to a convenient location for servicing. Therefore, if a vehicle loses its air pressure in a heavily traveled roadway or in an inaccessible, inconvenient location, such vehicle may be temporarily moved to a convenient location without creating a hazardous, unsafe condition.

The pneumatic brake system of the present invention also incorporates a novel accelerator control circuit including a plurality of pressure sensitive switches electrically connected in series and located within the respective dynamic, service, emergency, acceleration, and parking brake lines within the system. When any one of the pressure sensitive switches is opened because of a braking situation, the accelerator control circuit will prohibit acceleration of the vehicle. Therefore, only upon closure of all the pressure sensitive switches may the vehicle be accelerated. Accordingly, by the utilization of the acceleration control circuit of the present invention the life span of the service brakes and the safety of operation is appreciably enhanced.

An additional advantageous feature of the present invention is the provision of limiting valves disposed within the air lines supplying air to the front wheel service brakes. Said limiting valves operate to reduce the pressure of air directed to the service brakes in a slippery situation for effecting a deliberate safe application of the front wheel service brakes to avoid sliding or skidding so that the operator may have full control of the vehicle at all times.

Other advantages of the present invention will become readily apparent by reading the detailed description of the invention hereinbelow set forth.

DESCRIPTION OF THE PREFERRED EMBODIMENT

Figure 1:
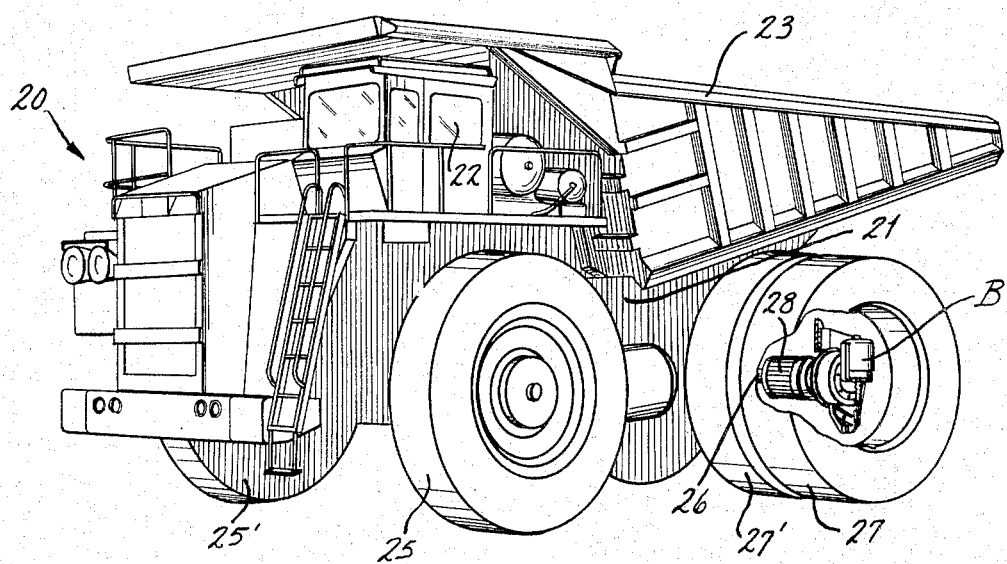
FIG. 1 is a perspective view of an electrically driven vehicle with a portion being broken away to illustrate a parking brake.

Referring now to the drawings wherein like reference characters designate like and corresponding parts, there is shown in FIG. 1 an off-road vehicle 20 of the rear dump type comprising a frame 21 having a cab 22 and a load receiving bin 23 mounted thereon. Frame 21 is supported by a front axle 24 having wheels 25,25' on the opposed ends thereof and a rear drive axle 26 having tandem rear wheels 27,27' on each end portion thereof. Each front wheel 25,25', and each pair of tandem rear wheels 27,27' is provided with a conventional service brake S, shown schematically in FIG. 2, such as the air over hydraulic type having internal expanding shoes as is well known in the art. Vehicle 20 is driven by electrical traction motors 28 which are mounted on the end portions of rear axle 26 within the tandem rear wheels 27,27' and operated by a generator (not shown) driven by the vehicle diesel engine (not shown). Additionally, each set of tandem rear wheels 27,27' is equipped with a parking brake B which will be described in detail hereinbelow. The service brake S and parking brake B are controlled by a pneumatic brake system A, illustrated in FIG. 2, which effects selective and emergency application thereof as will be presently described.

Figure 2:
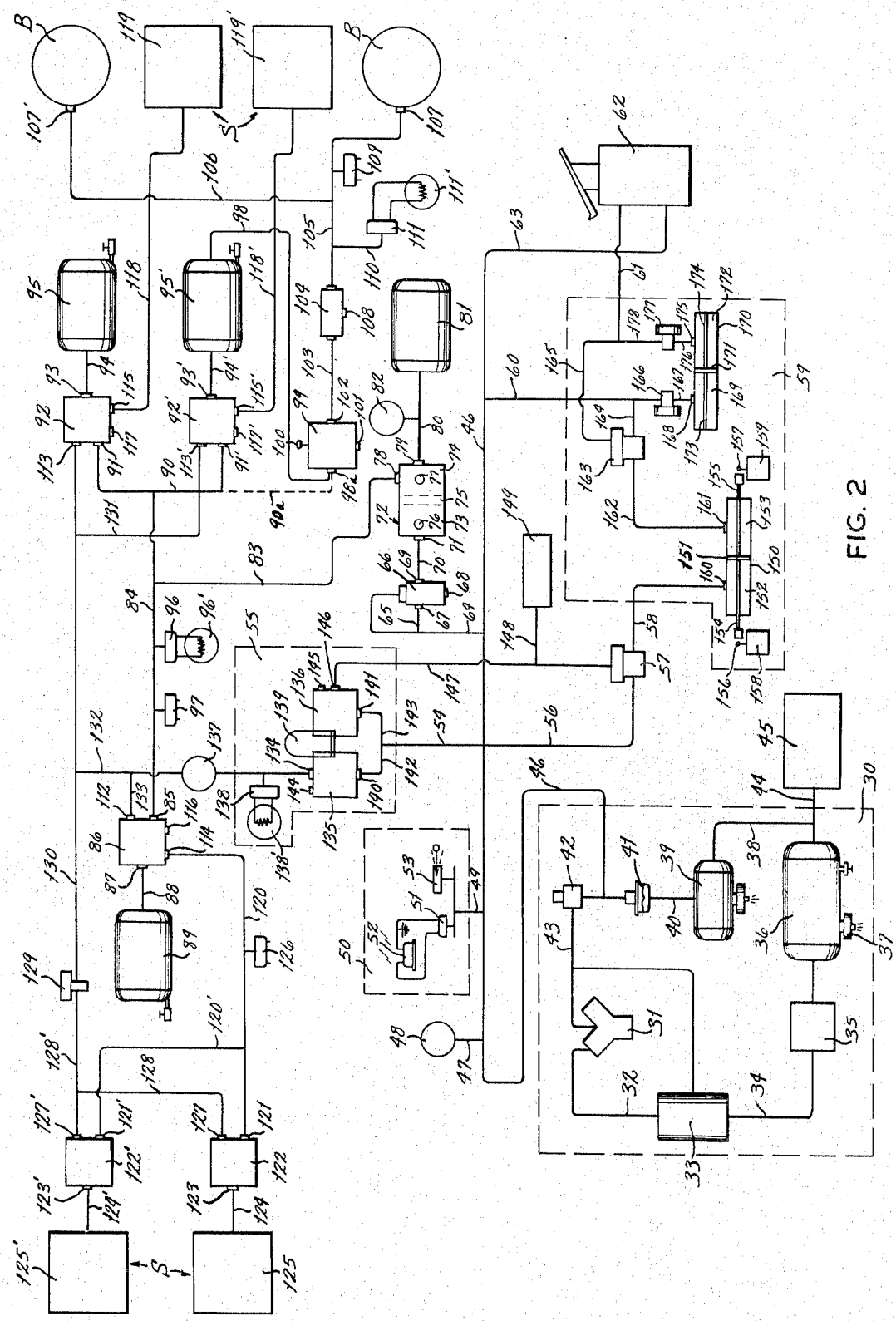
FIG. 2 is a schematic diagram of the pneumatic brake system of the vehicle.

Referring now to FIG. 2, the pneumatic brake system A comprises a source of air 30 which can be conveniently mounted on the truck frame 21, embodying an air compressor 31 which supplies air through conduit 32 to a standard aftercooler 33 which receives and spins the hot, "wet" air for cooling same and for removing the moisture therefrom; the air additionally passing through a filter (not shown) which is disposed transversely within the after cooler 33 for removing solid dirt particles. From aftercooler 33 the air passes through conduit 34 and check valve 35 into a "wet" air reservoir 36 wherein the air is further cooled for removing the excess moisture which is collected in a settlement receptacle (not shown) for draining through an automatic drain valve 37. Thus, substantially all of the moisture initially contained within the compressor supplied air is removed by the aftercooler 33 and the "wet" air reservoir 36. Connected in series with "wet" air reservoir 36 by conduit 38 is a "dry" air reservoir 39 which is in communication by conduit 40 with a lubricator 41 which sprays, in atomizing fashion, small particles of lubricating oil within conduit 40 for ultimate transmission of same through the pneumatic brake system A for lubricating the various components therein. The conduit 40 is also connected to one side of a conventional governor 42 which is adapted to maintain the air pressure within said source of air 30 between 120–135 PSI. The other side of governor 42 is connected by line 43 to the air compressor 31 so that when the air pressure within the source of air 30 attains the maximum operating pressure, the line 43 is vented for operating a valve (not shown) within the compressor 31 to prevent same from continuing to pressurize the air reservoirs 36 and 39.

Said source of air 30 is in communication by conduit 44 to a conventional air starter 45 which is adapted to start the engine of vehicle 20. Said source of air 30 is also connected to a main line 46 which is connected to conduit 40 intermediate the lubricator 41 and the governor 42. Main line 46 supplies air through branch conduit 47 to a conventional pressure gauge 48 and through conduit 49 to a warning device 50. Both the pressure gauge 48 and the warning device 50 are located within the vehicle cab 22 for convenient observation of the air pressure within main line 46. The warning device 50 embodies a pressure-sensitive switch 51 which is adapted to close upon attainment of a predetermined air pressure for energizing a buzzer 52. Warning device 50 also comprises a wig wag 53 which is located within the upper left-hand corner of vehicle cab 22 and is lowered into the operator's line of vision upon attainment of a predetermined pressure. Thus, both buzzer 52 and wig wag 53 serve to indicate to the vehicle operator that the vehicle is losing air pressure within main line 46.

Main line 46 also supplies air through branch conduit 54 to a brake application valve 55 being adapted for selectively controlling the application of the service and dynamic braking of vehicle 20, as will be further described hereinbelow. Said main line 46 is connected by a branch conduit 56 to one side of a pilot valve 57, the other side of which is in communication by conduit 58 to a throttle control 59 which is also in communication by branch conduit 60 to main line 46. Said throttle control 59, which will be described in detail hereinbelow, is adapted for regulating the speed of the vehicle engine to effect the dynamic braking of the vehicle 20. Throttle control 59 is connected by conduit 61 to an accelerator, or throttle valve 62, which is connected by branch conduit 63 to main line 46. The throttle valve 62 meters air to the throttle control 59 for selectively increasing or decreasing the speed of the vehicle engine as will be later seen.

Main line 46 is connected by branch conduits 64 and 65 to an automatic emergency relay valve 66 having an intake port 67 connected to the branch conduit 65; an exhaust port 68 in communication with the atmosphere; and a discharge port 69 connected by conduit 70 to the intake port 71 of a valve housing 72. Said automatic emergency relay valve 66 is preset to open at 75 PSI, at which pressure the air entering valve 66 through branch conduit 64 will unseat a relay valve piston (not shown) for establishing communication between conduits 65 and 70 for directing air within said valve housing 72.

Valve housing 72 comprises a brake lock valve 73 and an emergency reapplication valve 74; said valves 73 and 74 being separated by a check valve 75 and manually operated by control buttons 76,77, respectively. Emergency reapplication valve 74 is provided with an emergency port 78 and a reservoir port 79, which latter is connected by a conduit 80 to a reapplication air reservoir 81 for purposes to be later described. A pressure gauge 82 is in circuit with the conduit 80 and is located within the vehicle cab 22 for a ready determination of the air pressure within the reservoir 81 at all times. The reservoir port 79 is in open communication with the intake port 71 through a passage (not shown) containing said check valve 75 so that air is permitted to pass through conduit 80 to the reservoir 81 for charging same, while back flow through the conduit 80 is precluded by check valve 75. Communication between the reservoir port 79 and the emergency port 78 is normally closed by said emergency reapplication valve 74 but is established upon engagement of the control button 77. The emergency port 78 is in open communication through a passage (not shown) with the intake port 71, which passage is closed only upon engagement of the button 76 of brake lock valve 73.

Said emergency port 78 of said emergency reapplication valve 74 is connected by emergency lines 83 and 84 to an emergency port 85 of a conventional emergency relay valve 86 having a reservoir port 87 connected by a conduit 88 to an emergency air reservoir 89. The emergency lines 83,84 are also connected through branch emergency line 90 to the emergency ports 91,91' of conventional emergency relay valves 92,92', each having a reservoir port 93,93' connected by a conduit 94,94', respectively, to an emergency reservoir 95, 95', respectively. Disposed within emergency line 84 are a pair of pressure switches 96 and 97 which are adapted to open and close responsive to a predetermined pressure within the emergency line 84. Pressure switch 96 is connected in circuit with a brake lock lamp 96'; and the switch 97 with an accelerator control circuit C (FIG. 7) to be later described.

Said emergency reservoir 95' is also connected by line 98 to the intake port 98a of a manual control valve 99 which is conveniently located within vehicle cab 22; said manual control valve 99 being operated by a control button 100. Said manual control valve 99 is provided with an exhaust port 101 and an outlet port 102, which latter is connected by conduit 103 to one side of a quick release valve 104, the other side being connected by lines 105 and 106 to the supply ports 107,107' of each parking brake B, which will be described in detail hereinbelow. The quick release valve 104, which reduces the time required to exhaust air within lines 105 and 106, is of conventional construction incorporating a spring loaded diaphragm (not shown) arranged to permit air pressure to flow in a direction toward parking brakes B but, when supply pressure is reduced by engagement of said button 100 for exhausting the air in the conduit 103 through the exhaust port 101, the air within lines 105 and 106 is vented through the exhaust port 108 of quick release valve 104. Disposed within line 105 there is a normally opened pressure switch 109 which is adapted to be closed upon attainment of a line pressure in excess of 60 PSI and is connected in circuit with the accelerator control circuit C (FIG. 7) to be later described. Line 105 is also connected through a conduit 110 to a pressure switch 111 which is connected in circuit with a parking brake lamp 111' located within the vehicle cab 22. The parking brake lamp 111' is illuminated when the air pressure within the line 105 is exhausted.

Alternatively, said intake port 98a of the manual control valve 99 may be connected, as by line 90a, to the branch emergency line 90, instead of being connected to the emergency reservoir 95' by line 98. In this instance, the parking brake B will be manually applied, as before, but additionally will be automatically applied upon reduction of air pressure within the emergency lines 83,84, branch emergency line 90 and line 90a to a predetermined level, such as 60 PSI. Therefore, by connecting said intake port 98a to the branch emergency line 90, an additional safety feature is developed by effecting simultaneous application of both the service brakes S and the parking brake B in an emergency situation.

Emergency relay valves 86,92, and 92' are of conventional construction of the type regularly used in air brake systems comprising a combination relay valve (not shown) and an emergency valve (not shown) which cooperates to serve as a relay station to normally control the service brakes S under usual circumstances and to automatically apply same in an emergency situation. In addition to the reservoir ports 87, 93,93', and the emergency ports 85,91,91', each emergency relay valve 86, 92,92' is furnished with a service port 112,113,113', respectively; a brake port 114, 115, 115', respectively; and an exhaust port 116, 117, 117', respectively.

The brake port 115,115' of each emergency relay valve 92,92' is connected by conduits 118,118', respectively, to the conventional right and left rear wheel brake assemblies 119,119', respectively, of service brakes S. The brake port 114 of emergency relay valve 86 is connected by conduits 120,120' to the intake port 121,121' of a limit valve 122,122', respectively; the discharge port 123,123' of each being connected by conduit 124,124' to the right and left front wheel brake assemblies 125,125', respectively, of service brakes S. Both front and rear brake assemblies 125,125', 119,119', respectively, comprise the conventional air over hydraulic pressure convertors (not shown) which multiplies the system air pressure considerably as is well known in the art. Also disposed within conduit 120 is a pressure switch 126 which is normally closed but is opened when the air pressure within conduit 120 attains a predetermined amount, such as 30 PSI. The pressure switch 126 is connected in circuit with the accelerator control circuit C (FIG. 7) to be described.

Each limit valve 122,122' is provided with a port 127, 127', respectively, which is connected in parallel by lines 128, 128' to one side of a solenoid valve 129, the other side being connected to a service line 130. Said solenoid valve 129 is normally opened and is adapted to close manually by a conventional control (not shown) located within the vehicle cab 22. Under normal driving conditions, the limit valves 122 and 122' additionally function as quick release valves for exhausting air within brake assemblies 125,125' upon decrease of pressure within conduits 120 and 120'; but when the solenoid valve 129 is closed at the driver's option, the limit valves 122 and 122' function to reduce the front wheel braking of brake assemblies 125,125' by one-half. Each limit valve 122,122' embodies a conventional spring-urged valve piston (not shown) which is normally positioned during braking for permitting full air flow from conduits 120 and 120' through a passage (not shown) connecting the intake ports 121,121', respectively, with discharge ports 123,123', respectively. However, when the solenoid valve 129 is closed the said piston (not shown) is urged through the bias of a spring (not shown) into a position for restricting the passage, thereby limiting the air directed to the brake assemblies 125,125' by one-half. Thus, in a slippery road condition, air pressure to the front wheel assemblies 125,125' may be limited for avoiding severe service brake application which could result in undesirable sliding.

Service line 130 is connected to said service port 113 of emergency relay valve 92; to the service port 113' of emergency relay valve 92' by line 131; and to the service port 112 of emergency relay valve 86 by lines 132 and 133. The line 132 is also connected to the discharge port 134 of a service braking valve 135 located within said brake application valve 55 which also contains a dynamic braking valve 136. Said line 132 incorporates a conventional pressure gauge 137 located within the vehicle cab 22 for ready determination of the service line air pressure and a stop light pressure switch 138 which illuminates a conventional lamp 138' to indicate that the brakes are in an applied condition.

Brake application valve 55 also comprises a conventional brake treadle 139 which is adapted to be engaged by the foot of the vehicle operator. Said brake treadle 139 is connected in tandem to said service braking valve 135 and dynamic braking valve 136, each of which are provided with: an intake port 140,141, respectively, and being connected by conduits 142,143, respectively, to the branch conduit 54 of the main line 46; and an exhaust port 144,145, respectively, being in communication with the atmosphere. The brake treadle 139 controls the entry of air within the service braking valve 135 and the dynamic braking valve 136; said brake treadle 139 having to be depressed approximately one-half before the service brake intake port 140 is opened thereby assuring that dynamic braking will occur first. Said dynamic braking valve 136 is provided with a discharge port 146 which is connected by a conduit 147 to said pilot valve 57 for impingement of air upon a relay piston (not shown) which operates to open the pilot valve 57 for permitting air from the main line 46 and branch conduit 56 to enter conduit 58 to the throttle control 59. Also in communication with the dynamic braking valve 136 through conduits 147 and 148 is a conventional electrical reostat 149 which is in electrical circuit (not shown) with the traction motors 28 of the vehicle 20 for effecting dynamic braking to be presently described.

Throttle control 59 includes an air cylinder 150 having a dual-acting piston 151 separating cylinder 150 into chambers 152 and 153; there being piston rods 154,155 within each chamber 152 and 153 and extending outwardly endwise thereof. The outer end portion of each piston rod 154,155 is adapted to engage a switch arm 156,157, respectively, of a brake set-up relay switch 158 and an accelerator set-up relay switch 159, respectively. Each chamber 152, 153 is provided with a port 160, 161, respectively; the port 160 being connected to conduit 58 and port 161 being connected by conduit 162 to one side of a pilot valve 163, the other side of which is connected by conduit 164 to the branch conduit 60 of main line 46. Communication between conduits 162 and 164 is normally closed by a relay piston (not shown) contained within said pilot valve 163. Said pilot valve 163 is in communication by a conduit 165 and said conduit 61 with said throttle valve 62. Thus, when the throttle valve 62 is depressed, air will be directed from main line 46, branch conduit 63, conduits 61 and 165 for urging said relay piston (not shown) downwardly for opening communication between conduits 162 and 164, for purposes to be later described.

Branch conduit 60 is connected to one side of an advance idle solenoid 166, the other side of which is connected by a conduit 167 to an air port 168 being in communication with an air chamber 169 of an air throttle cylinder 170. Said advance idle solenoid 166 is normally in opened condition to establish communication between branch conduit 60 and air chamber 169. Disposed within air throttle cylinder 170 is a dual-acting piston 171 for dividing same into said air chamber 169 and an air chamber 172; said piston having piston rods 173 and 174 disposed within the respective air chambers 169 and 172. The piston 171 is spring urged (not shown) into a predetermined position when air is exhausted from air chambers 169 and 172. The said piston 171 is adapted to move axially within throttle cylinder 170 for controlling the speed of the vehicle engine. Air chamber 172 is provided with an air port 175 which is connected by a conduit 176 to one side of a throttle cut-off solenoid 177, the other side of which is connected by conduits 178 and 61 to the throttle valve 62. Said throttle cut-off solenoid 177 is normally in opened condition to establish communication between throttle valve 62 and air chamber 172. Therefore, upon opening of throttle valve 62, air from branch conduit 63 will be metered through conduits 61, 178, and 175 for controlling the movement of piston 171 to increase or decrease the speed of the vehicle engine.

Both the advance idle solenoid 166 and the throttle cut-off solenoid 177 are connected in circuit (not shown) with said brake set-up relay switch 158. When said brake set-up switch 158 is closed, the advance idle solenoid 166 is de-energized and the throttle cut-off solenoid 177 is energized into opened condition; and when said brake set-up relay switch 158 is opened, said advance idle solenoid 166 is energized and the throttle cut-off solenoid 177 is de-energized into closed condition whereby the piston 171 will be spring urged into a predetermined position for maintaining a constant speed, such as, 1,400 RPMS, of the vehicle engine to condition same for dynamic braking.

Figure 7:
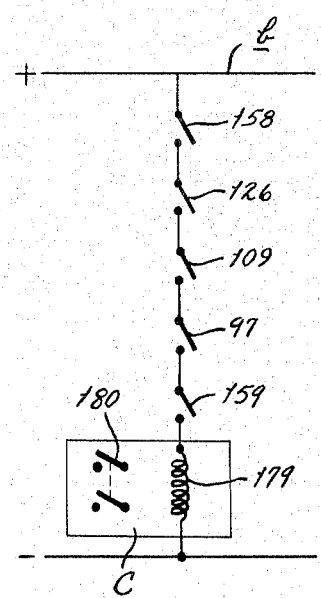
FIG. 7 is a schematic circuit diagram of the accelerator control circuit of the pneumatic brake system.

Said pneumatic braking system A also incorporates, as a safety feature, an accelerator control circuit C, which is illustrated in FIG. 7. Accelerator control circuit C operates to prevent acceleration of the vehicle when either the service brakes S or the parking brakes B are in a brake applied condition. The accelerator control circuit C comprises a solenoid 179 which controls an accelerator cut-off switch 180 so that when solenoid 179 is energized, the accelerator cut-off switch is closed, thereby permitting acceleration of vehicle 20; and when the solenoid 179 is de-energized, the accelerator cut-off switch 180 is opened, thereby preventing acceleration of vehicle 20. Solenoid 179 is connected in circuit with the vehicle battery $b$ and is connected in series with the said brake set-up relay switch 158, said accelerator set-up relay switch 159, said pressure switch 97 located in emergency line 84, said pressure switch 109 located in parking brake line 105, and said pressure switch 126 located within the conduit 120. The brake set-up relay switch 158 and the accelerator set-up relay switch 159 are controlled by the axial movement of said piston 151. The pressure switches 94, 109 and 126 are normally closed and are adapted to open upon a predetermined pressure within the respective lines 84, 105, and 120. The pressure switches 94 and 109 are adapted to open when the air pressure within lines 84 and 105, respectively, is reduced to approximately 60 PSI. Said switch 126 is adapted to open upon the air pressure in conduit 120 attaining approximately 30 PSI. Thus, it will be seen that when any one of the switches 97, 109, 126, 158, and 159 are opened, said solenoid 179 is de-energized for opening the accelerator cut-off switch 180 thereby prohibiting the acceleration of vehicle 20. Therefore, it will be noted that all of the said switches 97, 109, 126, 158 and 159 must be closed before vehicle 20 may be accelerated.

PARKING BRAKE B

Figure 3:
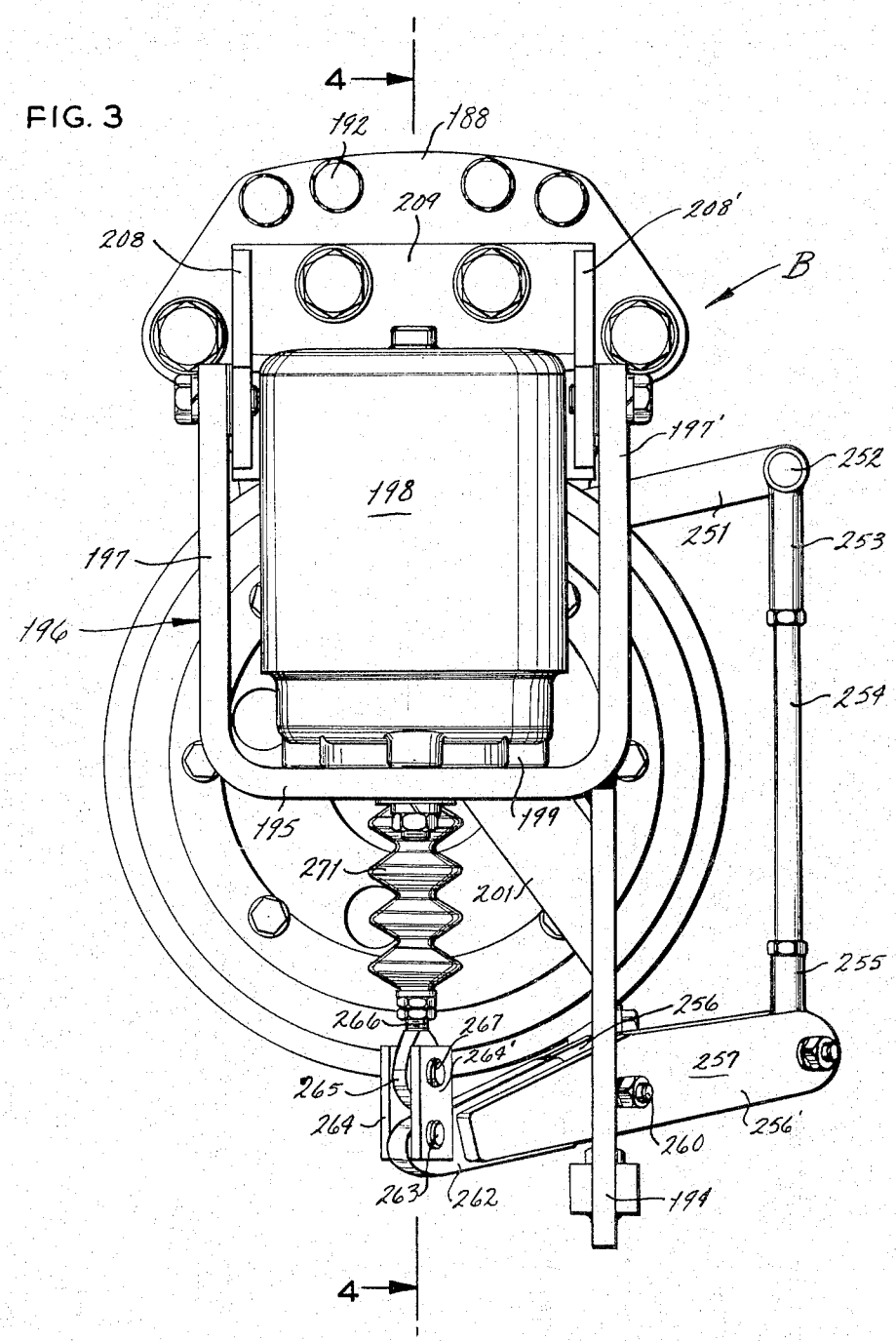
FIG. 3 is a side elevational view of the parking brake.
Figure 4:
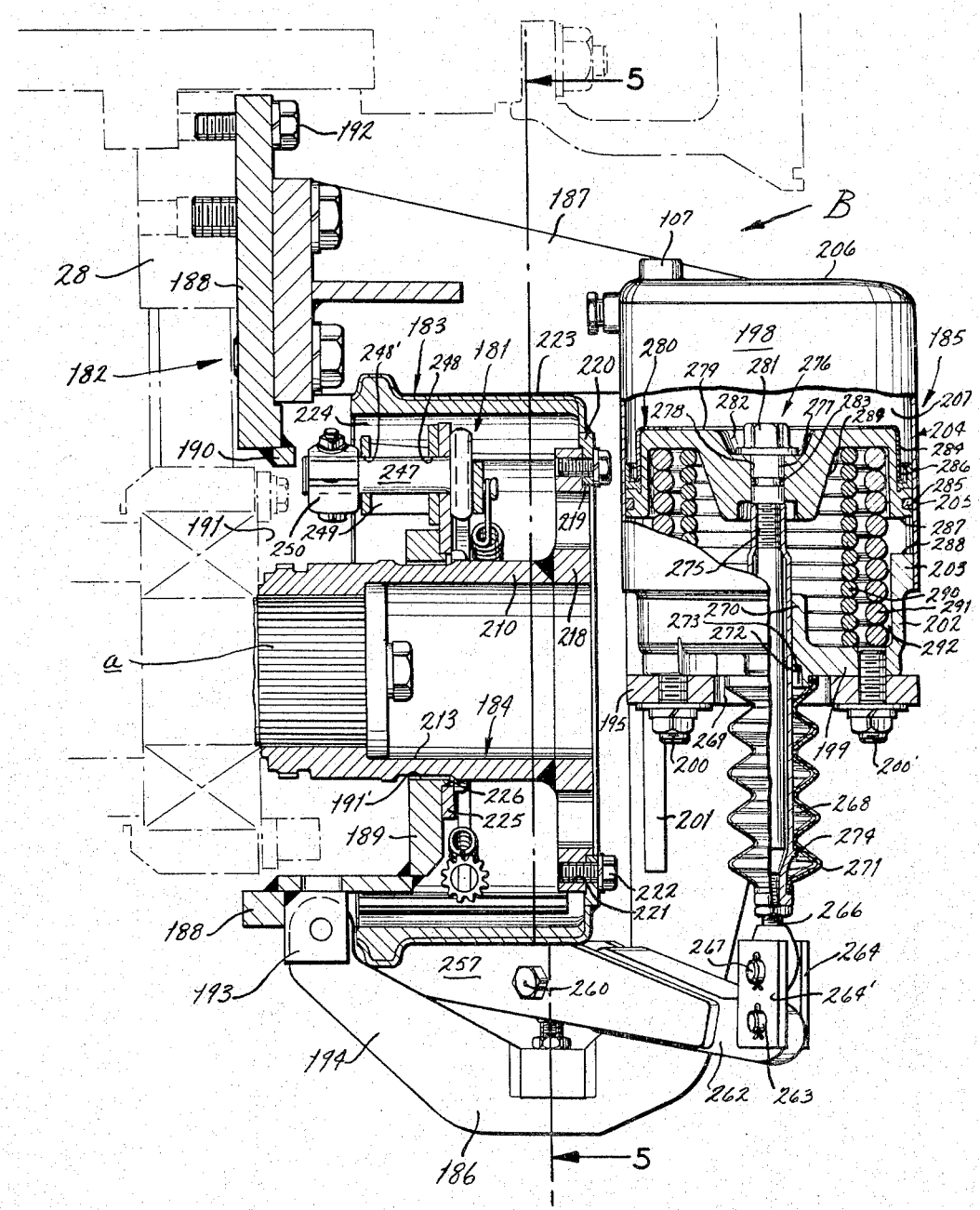
FIG. 4 is a vertical section taken on the line 4—4 of FIG. 3.
Figure 5:
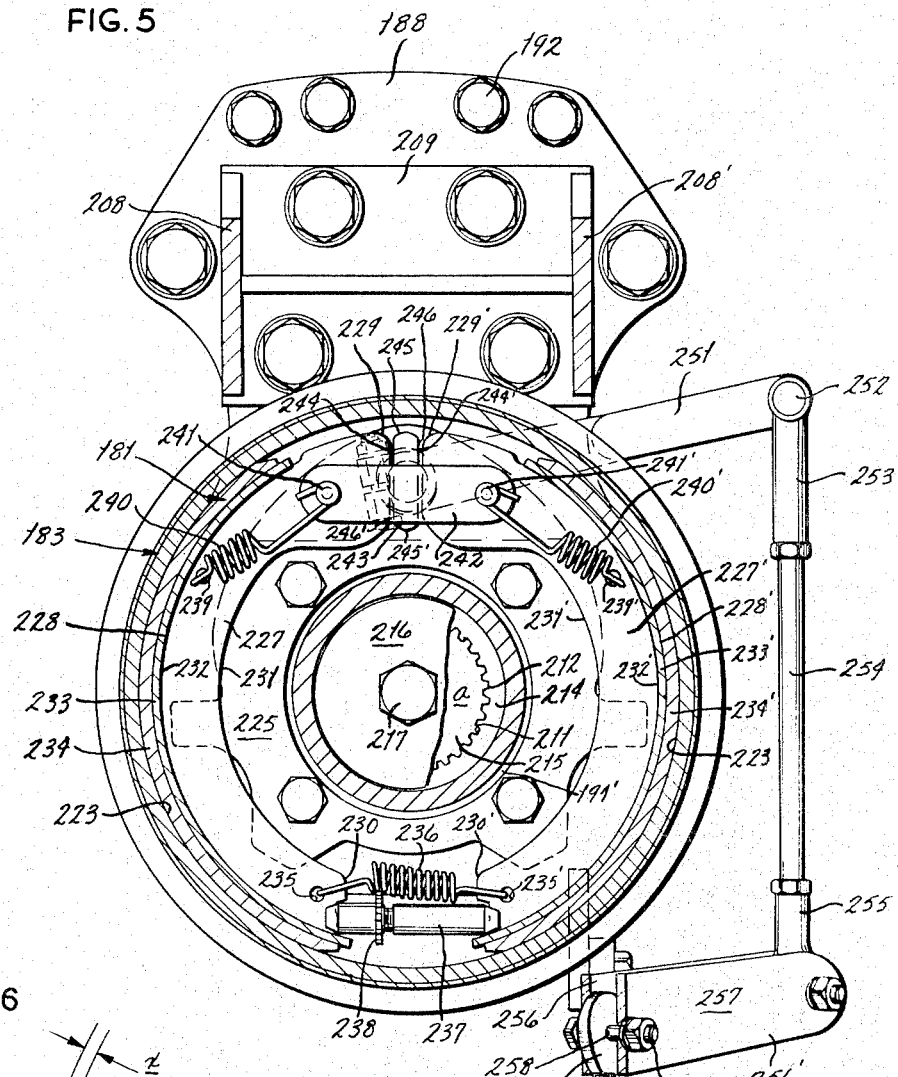
FIG. 5 is a vertical section taken on line 5—5 of FIG. 4.

Referring now to FIGS. 3-5 of the drawings, Parking brake B generally comprises a brake assembly 181 (FIG. 4) fixed by a mounting bracket 182 to the traction motor 28 and a brake drum 183 fixed by hub 184 to the armature $a$ of traction motor 28; there being a brake actuator 185 connected by support brackets 186, 187 to the mounting bracket 182, which actuator 185 effects engagement and disengagement of brake assembly 181 with the brake drum 183. The parking brake B is mounted on traction motor 28 so that easy access may be provided to the brushes of armature $a$ (FIG. 1). For purposes of description, the terms "rearward" or "rearwardly" and "forward" or "forwardly" will designate direction toward and away from the vehicle frame 21 respectively.

The mounting bracket 182 comprises a pair of spaced-apart bracket plates 188, 189 connected by an intervening sleeve 190; each bracket plate 188, 189 having an opening 191, 191' coaxial with armature $a$. The bracket plate 188 is secured to traction motor 28, as by bolts 192, with the armature $a$ being received coaxially within openings 191, 192'. Formed integral with the lower portion of mounting bracket 182 is a depending lug 193, to which is connected one end of a J-shaped arm 194 of support bracket 186; the other, or upper end, of the J-shaped arm 194 being eccentrically fixed to the web portion 195 of a U-shaped strap 196 having upstanding parallel arms 197, 197'. Received between arms 197, 197' is a brake actuator housing 198 having a base plate 199 secured to the web 195, as by bolts 200, 200'; there being a gusset plate 201 connecting the web 195 and the J-shaped arm 194 for bolstering the strength thereof. The outer peripheral portion of the base plate 199 is integrally formed with an upstanding flange 202 having at its upper end a thickened portion 203 to which is fixed the lower end of a cylinder 204 having an annular side wall 205 and a top wall 206. Said walls 205, 206 cooperate to define a compartment 207 for brake actuator 185, which compartment 207 is in communication with supply port 107 for connection through the conduit 105 to the brake system A (FIG. 2). The upper portion of each arm 197, 197' is secured to the forward end portion of the arms 208, 208', respectively, of the support bracket 187, there being a web 209 connecting the rearward end of the arms 208, 208' and bolted to the bracket plate 188. Provided for reception within opening 191' of the bracket plate 189 is the cylindrical sleeve 210 of the hub 184, said sleeve 210 having internal splines 211 adjacent its inner end portion for receiving the exertnal splines 212 of the armature $a$. The sleeve 210 is provided with a counterbore 213 for developing a shoulder 214 which is in planar alignment with the end wall 215 of armature $a$. Received within the counterbore 213 for abutment against the shoulder 214 and the armature end wall 215 is an adaptor plate 216 having an outer diameter slightly less than the inner diameter of the counterbore 213. The adaptor plate 216 is secured to the end wall 215 of armature $a$, as by a bolt 217, thereby assuring fixed engagement of the hub 184 to the motor armature $a$.

Formed integral with the forward end portion of the sleeve 210 is an annular flange 218 having a peripheral notch 219 provided within its forward face and radially outwardly from sleeve 210, which notch 219 is open to the outer periphery for accommodating the end wall 220 of brake drum 183; there being a plurality of tapped openings 221 provided within the end wall 220 and the flange 218 in the region of notch 219 for receiving bolts 222 thereby effecting fixed engagement. The brake drum 183 also embodies an annular side wall 223 integrally formed with, and in normal relationship to, the outer periphery of the end wall 220; said drum 183 being opened at its rearward end portion for defining a compartment 224 for accommodating brake assembly 181. Thus, it will be observed that the brake drum 183 and the hub 184 are interengaged with the armature $a$ for rotation therewith.

Figure 6:
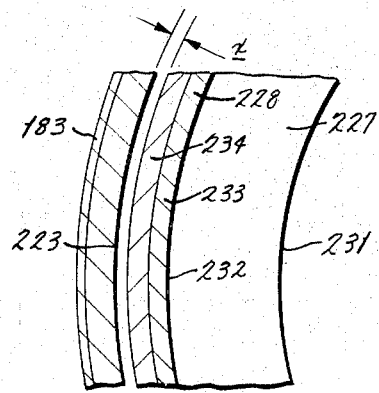
FIG. 6 is an enlarged fragmentary view illustrating the clearance between the brake shoes and the brake drum of the parking brake.

Provided surroundingly of the sleeve 210 is a backing plate 225 fixed to the bracket plate 189, said backing plate 225 having an opening 226 diametrically larger than the outer diameter of the hub sleeve 210 for permitting unrestricted rotation thereof. Pivotally mounted on the forward face of the backing plate 225 are a pair of semi-arcuate webs 227, 227' of the brake shoes 228, 228', respectively; each web 227, 227' having an upper end edge 229, 229', a lower end edge 230, 230', an inner arcuate side edge 231, 231' and an outer arcuate sie edge 232, 232'. Formed integral with a portion of the latter edge 232, 232' is arcuate flange 233, 233', respectively, each having a brake lining layer 234, 234' on its outer face for braking engagement with the inner face of the side wall 223 of brake drum 183. The clearance $x$ between brake shoes 228, 228' and said side wall 223 is relatively small when the brake assembly 181 is in a brake-off condition (see FIG. 6). Provided within each web 227, 227' adjacent its lower end edge 230, 230' is an aperture 235, 235' for receiving the respective ends of a spring 236 interengaging said webs 227, 227' and normally urging the lower end edges 230, 230' toward one another. Also engaging the end edges 230, 230' of the webs 227, 227' are the end portions of an adjusting mechanism 237 having a spur or star wheel 238 which engages spring 236 for adjusting the tension thereof. Mechanism 237 also serves to adjust distance between the lower end portions 230,230'.

Each web 227,227' adjacent its upper portion is provided with an aperture 239,239' for receiving one end of a spring 240,240', respectively, the other end of each spring 240,240' being engaged to an anchor pin 241,241' which passes through the end portions of a link 242 and associated slots (not shown) within the webs 227,227' for engagement to said backing plate 225. Springs 240,240' normally bias webs 227,227' in a direction away from the side wall 223 of brake drum 183.

The upper end edges 229,229' are spaced-apart for receiving a substantially rectangular shaped cam 243 having side walls 244,244', which are presented adjacent the upper end edges 229,229', and end walls 245,245'. Therefore, when the cam 243 is rotated in a clockwise direction, as viewed in FIG. 5, the junction 246 of side wall 244' and end wall 245 and the junction 246' of side wall 244 and end wall 245' will engage the upper end edges 229,229', respectively, for urging brake shoes 228,228' into a brake-applied position with the side wall 223 of brake drum 183. Since the clearance x between brake shoes 228,228' and brake drum 183 is relatively small, cam 243 will effect, upon minimum rotation, substantial simultaneous engagement and disengagement between shoes 228,228' and brake drum 183. It will be observed that forward movement of cam 243 is restricted by the distance position of link 242 and rearward movement is restricted by backing plate 225. Thus, cam 243 is in planar alignment with the web edges 229,229' at all times.

Fixed to the rearward face of cam 243 is a camshaft 247 which is journaled within opening 248,248' forming bearings within the backing plate 225 and within a cam bracket 249 being fixed to the rearward face of the backing plate 225. The cam remote end portion of the camshaft 247 projects rearwardly endwise of the brake drum opening 224 for connection by a clamp 250 to one end of a crank arm 251, the other end being connected by a pin 252 to a clevice 253. The lower portion of the clevice 253 is internally threaded for threadedly engaging the upper end of a push rod 254, the lower end being threadedly engaged to a spherical rod link 255 which, in turn, is pivotally connected to one of the arms 256,256' of an actuating lever 257. Provided centrally of the lever 257 is the eyelet 258 of a spherical rod link 259 which is pivotally mounted by a pin 260 for rockable movement of the lever 257 thereabout. The lower end of the rod link 259 is threadedly received within an internally threaded socket 261 provided within said J-shaped arm 194 of support bracket 186; said rod link 259 serving as a fulcrum for the lever 257. Interposed between and fixed to the arms 256,256' adjacent the other end of the lever 257 is a connector plate 262 to which is attached on either side thereof by a pin 263, a pair of links 264,264' which receive the eyelet 265 of a spherical rod link 266 for connection thereto by pin 267. The threaded upper portion of rod link 266 is in threaded engagement with the lower end of a piston rod 268 of brake actuator 185.

Piston rod 268 projects upwardly through an opening 269 within the web portion 195 of said U-shaped strap 196 into a bushing 270 formed integral with the base plate 199 of brake actuator housing 198. Fixed to the lower end of the piston rod 268 is one end of a bellow-like, rubber boot 271, the other end being conveniently attached to the base plate 199 surroundingly of the bushing 270 for precluding entry of dirt or other impurities into the actuator compartment 207. Coaxially with bushing 270, base plate 199 is provided with a counterbore 272 for developing a shoulder 273 against which abuts an annular bead 274 located spacedly from the lower end of the piston rod 268 for limiting the upward movement thereof. The upper end portion of the piston rod 268 is provided with internal threads 275 for threaded engagement to an anchor bolt 276 having a smooth portion 277 passing through a bore 278 within a head 279 of a piston 280; said anchor bolt 276 having an enlarged head portion 281 received within a recess 282 in the piston head 279 for fixing piston 280 to the piston rod 268. Provided encirclingly of the smooth portion 277 of the anchor bolt 276 is an O-ring 283 for effecting sealing relationship therebetween.

Piston head 279 is provided with an annular outer wall 284 being of slightly less diameter than the corresponding dimension of housing wall 205; there being a wiper ring 285 and a sealing ring 266, such as of the leather type, spacedly upwardly from the wiper ring 285 for enhancing sealing engagement therebetween. The outer wall 284 of the piston head 279 incorporates a lower peripheral edge 287 which is aligned with a seat 288 developed by the upper edge of the thickened portion 203 of base plate 199. Within the lower face of the piston head 279 there is provided an annular recess 289 for receiving one end of a pair of concentric springs 290 and 291, the other end of the springs 290, 291 being received within an annular pocket 292 formed within the base plate 199 between the flange 202 and the bushing 270. The spring 290 is of less diameter and of less gauge than the spring 291 with both springs 290 and 291 cooperating to normally urge the piston head 279 upwardly toward the housing top wall 206, in which position bead 274 of the piston rod 268 will abut against the shoulder 273. The strength of springs 290 and 291 is more than sufficient in applying parking brakes B to satisfy the S.A.E. requirements that a vehicle to be able to park on a 15 percent slope.

When air is supplied to brake actuator chamber 207 through port 107, the air impinges upon the upper face of piston head 279 for urging same downwardly against the bias of springs 290,291 until the lower edge 287 of the piston head 279 engages seat 288. With the downward movement of the piston head 279, piston rod 268 effects the lowering of actuating lever 257 which pivots about its fulcrum link 259 for elevating the opposite end of actuating lever 257, and push rod 254. With the elevation of push rod 254, crank arm 251 effects counterclockwise rotation of camshaft 247 for rotating cam 243 so that the junctions 246 and 246' of cam 243 are disengaged from the upper end edges 229,229', respectively, thereby releasing the brake shoes 228,228' from the engagement with the brake drum 183. Therefore, as long as there is sufficient air pressure within the chamber 207, the brake shoes 228,228' will be disengaged. However, when the air pressure within the chamber 207 is exhausted, as in an emergency or a parking situation, which will be further described in the discussion of braking system A, the springs 290 and 291 urge the piston head 279 and, hence, the piston rod 268, returningly upwardly. At this occurs, the actuating lever 257 is pivoted about its fulcrum link 259 for lowering the push rod 254 thereby pivoting the crank arm 251 downwardly for rotating the cam-shaft 247 in a clockwise direction, as viewed in FIG. 4, so that the junctions 246 and 246' will engage the respective web upper end edges 229,229' for urging the brake shoes 228,228' into engagement with the brake drum 183. It will be noted that cam 243 is rotated through a small arc for effecting the braking and releasing action. Thus, in an emergency situation the time element for the application of the brake assembly 181 with the brake drum 183 is relatively short.

Thus, the present invention provides a novel safety and parking brake B which is applied for parking and locked in applied position after release of the air pressure within the brake actuator chamber 207. Additionally, the parking brake B is designed so that it cannot be released until there is sufficient line air pressure within lines 105 and 106 for releasing the brake actuator 185 as above described.

BRAKE SYSTEM OPERATION

Assuming that the line pressure within the brake system A is at 135 PSI with air reservoirs 36, 39, 89, 95 and 95' being fully charged with air, as well as the brake actuator chamber 207 of parking brake B whereby the latter is in a brake-off condition, vehicle 20 is in condition for acceleration.

ACCELERATION

When the vehicle operator engages the throttle valve 62, air from main line 46 and branch circuit 63 is directed through conduits 61 and 165 to pilot valve 163 wherein the air inpinges upon a valve piston (not shown) for establishing communication between conduits 164 and 162 for flow of air from main line 46 and branch conduit 60 through air port 161 into the chamber 153 for closing switches 158 and 159. Additionally, air is directed through the conduits 61 and 178, through the throttle cut-off solenoid 177, the conduit 176 and the port 175 into chamber 172 for axially moving piston 171 for controlling the speed of the vehicle engine. Thus, by selective engagement of throttle valve 62, the speed of the vehicle engine may be increased or decreased accordingly. It will be observed that during the acceleration of vehicle 20, the pressure switches 97, 109,126 and switches 158 and 195 (FIG. 7) are closed thereby permitting acceleration. If one of said switches 97,109,126, 158 or 159 were opened, vehicle 20 could not accelerate because of the accelerator control circuit C, as described above.

DYNAMIC BRAKING

When the vehicle operator initially engages brake treadle 139, port 141 of dynamic braking valve 136 is opened for receiving air from main line 46, branch conduit 54, and conduit 143 for emitting same through discharge port 146 into the conduit 147 for direction to the pilot valve 57. The air impinges against a relief valve piston (not shown) within pilot valve 57 for opening same to permit air from main line 46 and branch conduit 56 to pass therethrough into the conduit 58 for entry through port 160 into the air chamber 152 thereby forcing piston 151 axially therein for opening the brake set-up switch 158. When this occurs, said advance idle solenoid 166 and said throttle cut-off solenoid 177, which are connected in circuit with said brake set-up switch 158, will be energized and de-energized, respectively, into closed condition thereby shutting off the flow of air to the air throttle cylinder 170. Since the piston 171 is spring-urged, (not shown) the piston 171 will automatically move into a predetermined position for operating the vehicle engine at 1,400 RPMS which is necessary for dynamic braking. The simultaneous interlock action sets up the electrical system for the dynamic braking, wherein the electric traction motor 28 serves as a generator to convert the kinetic or mechanical energy of the vehicle 20 into electrical energy which is dissipated through resistance grids thereby establishing a braking action.

Air is also directed through conduits 147 and 148 to the electrical reostat 149, which is in circuit with traction motor 28 and meters volts for sending electrical signals thereto. The reostat 149 automatically meters the volts depending on the amount of air being transmitted thereto. By so doing, the field of the traction motor 28 is controlled for regulating the speed of the vehicle. Moreover, the traction motor 28 is changed into a generator which runs current through a resistance grid for effexting the braking action. For a given torque to be exerted on the motor armature $a$ there will be a certain amount of current flow which will correspond to a predetermined voltage across the reostat 149. As the resistance in the reostat 149 is decreased or increased, the voltage across it for a given current will be decreased or increased and likewise the speed of the traction motor 28 decreased or increased.

When the operator releases brake treadle 139 the supply of air within lines 147,148 is exhausted through the exhaust port 145. Therefore, when the operator again presses the throttle valve 62, the piston 151 will axially move for closing the brake set-up switch 158.

SERVICE BRAKING

The service braking valve 135 of the brake application valve 55 is preset so that the intake port 140 will not open until the brake treadle 139 is depressed approximately 50 percent. By so doing, the vehicle 20 takes advantage of the dynamic braking before the application of the service brakes S. When the brake treadle 139 is depressed more than one-half, the air from main line 46, branch conduit 54 and conduit 143 is metered through discharge port 134, and the lines 132 and 133 to service port 112 for operating the emergency relay valve 86 to establish communication between reservoir port 87 and brake port 114 whereby air from the emergency air reservoir 89 will pass through the conduit 120, thereby opening switch 126 for preventing further acceleration of the vehicle by interrupting said accelerator control circuit C (FIG. 7), and conduit 120' into the intake ports 121,121' of limit valves 122,122', and thus through conduits 124,124', respectively, to the front wheel brake assemblies 125,125' for application of service brakes S. Additionally, the air is directed through the conduits 132, 130 and 131 to the service ports 113,113' of said emergency relay valves 92,92', respectively, for operating same to establish communication between the reservoir ports 93,93', respectively, and the brake ports 115,115', respectively, thereby permitting air from emergency air reservoir 95,95', respectively, to pass through the conduits 118,118', respectively, to the rear brake assemblies 119,119', respectively, for application of the service brakes S. The force in which the service brakes S is applied may be regulated by the vehicle operator by selective controlled depression of brake treadle 139. Upon release of the brake treadle 139 the air within service lines 132,130,131 and 133 is exhausted through the exhaust port 144. When said service lines 130,131,132 and 133 are exhausted, said emergency relay valves 86, 92, and 92' operate to re-establish communication between the brake port 114 and exhaust port 116 of the emergency relay valve 86; the brake port 115 and the exhaust port 117 of emergency relay valve 92; and the brake port 115' and the exhaust port 117' of the emergency relay valve 92' for exhausting the conduits 120,120', 118, and 118', respectively, to release the service brakes S.

In either an emergency or a slippery road condition, the operator may close the solenoid 129 by a control (not shown) conveniently located within the vehicle cab 22 for interrupting the air flow to lines 128,128' from the service lines 130 and 132. When this occurs the limit valves 122,122' reduces the volume of air entering the intake ports 121,121' through the conduits 120,120' for limiting the brake power of the front wheel brake assemblies 125,125' to one-half, thereby avoiding potential sliding of the vehicle 20.

EMERGENCY BRAKES

In the eveht that the line pressure within braking system A is reduced to approximately 75 PSI, a dangerously low level, system A incorporates an emergency braking feature for automatically applying the service brakes S. Under normal circumstances, when the air pressure within main line 46 reaches 120 PSI, the air compressor 31 is operated through governor 42 for supplying air to main line 46. Assuming that the main line 46 is broken or that the compressor 31 cannot supply a sufficient volume of air when the air pressure within the main line 46 reaches 90 PSI, the buzzer 52 is energized and the wig wag 53 is lowered for indicating to the vehicle operator that the main line 46 is losing air pressure.

Upon further drop in air pressure to approximately 75 PSI, the automatic emergency relay valve 66 is operated for closing the intake port 67 and for establishing communication between the discharge port 69 and the exhaust port 68 to exhaust the air within conduit 70 and emergency lines 83, 84 and 90. When this occurs, the emergency relay valves 86, 92 and 92' operate to establish communication between the reservoir port 87 and brake port 114 of emergency relay valve 86; and between the reservoir ports 93,93' and brake ports 115,115' of emergency relay valves 92,92', respectively, for discharging air from the emergency air reservoirs 89,95,95', respectively, through the condyits 120,120' ultimately to the brake assemblies 125,125' and through conduits 118,118' to the rear brake assemblies 119,119'. The service brakes will remain applied until air is resupplied to the emergency lines 83, 84 and 90 for operating emergency relay valves 86, 92 and 92' to exhaust air within conduits 120,120' through exhaust port 116 of emergency relay valve 86 and within conduits 118,118' through exhaust ports 117,117' of emergency relay valves 92,92', respectively. If desired, the service brakes S may be locked upon engagement of button 76 of the brake lock valve 73 thus preventing the resupply of air to the emergency lines 83,84 and 90.

Alternatively, in the event that the intake port 98a is connected by line 90a to the branch emergency line 90 instead of the the emergency reservoir 95' by line 98, as above described, the exhaustion of air from line 90 will also effect the release of air from the line 90a, the conduit 103 and the lines 105 and 106 for exhausting the air within brake actuator compartment 207 of parking brake B for effecting the application thereof. In this instance, both the service brakes S and parking brake B are simultaneously applied and may be locked by engaging the button 76 of the brake lock valve 73 whereby air is prohibited from entering the intake port 71 of the valve housing 72. The service brakes S and the parking brake B cannot be released until air is resupplied to the emergency lines 83, 84 and 90.

SERVICE BRAKE REAPPLICATION

In an emergency situation when both service brakes S and parking brakes B are applied, the air contained within reapplication reservoir 81 may be directed through the conduit 80 into the reservoir port 79 upon engagement of the button 77. The emergency reapplication valve 74 is thus opened for emitting air through emergency port 78 and into the emergency lines 83, 84 and 90. Such action operates the respective emergency relay valves 86,92, and 92' for exhausting the air within the respective brake assemblies 125,125' and 119,119' for releasing the service brakes S. The volume of compressed air within the reapplication reservoir 81 is sufficient to permit the release of said emergency relay valves 86, 92, and 92' from their emergency condition and to reapply the service brakes S up to four times.

PARKING BRAKE

The parking brake B is applied independently of the service brakes S except in the situation when the intake port 98a is connected to the branch emergency line 90, as above described. When the vehicle operator engages button 100 of control valve 99, the air within line 103 is exhausted through exhaust port 101 and the air within line 105 and 106 are exhausted by the quick release valve 104 through exhaust port 108. When this occurs the compressed air within the brake actuator compartment 207 is also exhausted for applying the parking brake B in a manner above described. To release the brake, the operator merely pulls the button 100 for re-establishing communication between the intake port 98a and the emergency reservoir 95' thereby receiving air from same to release the parking brake B.

We claim:

1. A pneumatic brake system for a vehicle of the type having a wheel brake assembly for actuating the vehicle service brakes comprising: a source of air under pressure; a first valve having an intake port, a discharge port and an exhaust port; first conduit means connecting said source of air to said first valve intake port; an air reservoir; a second valve having a reservoir port, an emergency port, a brake port, a service port, and an exhaust port; second conduit means connecting said air reservoir to said second valve reservoir port; third conduit means connecting said second valve emergency port to said first valve discharge port; fourth conduit means connecting said second valve brake port to the brake assembly of the vehicle service brake; a brake application valve comprising a service braking valve having an intake port, a service port, and an exhaust port; fifth conduit means connecting said source of air to said service braking valve intake port; sixth conduit means connecting said service braking valve service port to said second valve service port; said first valve being movable automatically responsive to a predetermined pressure within said first conduit means into first and second positions whereby:

in said first position said intake and discharge ports are opened and said exhaust port is closed for establishing communication between said first and third conduit means for supplying air to said second valve means; and in said second position, said intake port is closed and said discharge and exhaust ports are opened for exhausting the air within said third conduit means;

control means on said brake application valve for moving said service braking valve into first and second positions whereby:

in said first position, said intake port is closed and said service and exhaust ports are opened for exhausting said sixth conduit means; and in said second position, said intake and service ports are opened and said exhaust port is closed for establishing communication between said fifth and sixth conduit means for supplying air to said second valve;

said second valve being movable automatically responsive to the pressure within said third and sixth conduit means into first, second, and third positions whereby:

in said first position, said emergency and reservoir ports are opened and said service port is closed for establishing communication between said third and second conduit means for charging said air reservoir, and said brake and exhaust ports are opened for establishing communication between said fourth conduit means and said exhaust port for exhausting said fourth conduit means; and in said second position, said reservoir and brake ports are opened and said emergency, service and exhaust ports are closed responsive to the pressure within said third conduit means for establishing communication between said second and fourth conduit means for supplying air to said brake assembly to actuate said vehicle service brake; and in said third position, said service, reservoir and brake ports are opened and said emergency and exhaust ports are closed responsive to pressure within said sixth conduit means for establishing communication between said second and fourth conduit means for supplying air to said brake assembly to actuate said vehicle service brake;

said vehicle having a source of electrical power; an electrical traction motor for driving said vehicle; conductor means connecting said traction motor to said source of electrical power; air-operated electrical rheostat means within said conductor means for effecting dynamic braking of said vehicle; said brake application valve including a dynamic braking valve having an intake port, an exhaust port, and a discharge port; seventh conduit means connecting said dynamic valve intake port to said source of air; eighth conduit means connecting the discharge port of said dynamic braking valve to said electrical reostat means for supplying air thereto; said control means on said brake application valve being engaged to said dynamic braking valve for moving same into first and second positions whereby:

in said first position, said intake port is closed and said discharge and exhaust ports are opened for exhausting said eighth conduit means; and in said second position, said intake and said discharge ports are opened and said exhaust port is closed for establishing communication between said seventh and eighth conduit means for supplying air from said source to said electrical reostat means to effect dynamic braking of said traction motor.

2. The invention as defined in claim 1 and further characterized by said control on said brake application valve comprising a brake treadle connected in tandem with said service braking valve and said dynamic braking valve for simultaneous operation; said brake treadle being adapted for selective movement between a disengaged position and first, second, and third engaged positions whereby:

when said brake treadle is between said first and second engaged positions said dynamic braking valve is in its said second position for effecting dynamic braking and said service braking valve is in its first position; and when said brake treadle is between said second and third engaged positions, said dynamic braking valve is in its second position for effecting dynamic braking and said service braking valve is in its said second position for effecting application of the service brake.

3. The invention as defined in claim 2 and further characterized by: said brake treadle being in said first engaged position when said brake treadle is initially engaged; said brake treadle being in said third engaged position when said brake treadle is fully engaged; and said brake treadle being in said second engaged position when said brake treadle is engaged approximately midway between said first and third engaged positions.

4. A pneumatic brake system for a vehicle of the type having a wheel brake assembly for actuating the vehicle service brakes comprising:

a source of air under pressure;
a source of electrical power;
an electrical traction motor for driving said vehicle;
conductor means connecting said traction motor to said source of electrical power;
air-operated electrical rheostat means within said conductor means for effecting dynamic braking of said vehicle;
a brake application valve comprising a dynamic braking valve having an intake port, an exhaust port, and a discharge port;
first conduit means connecting said source of air to said dynamic valve intake port;
second conduit means connecting said discharge port of the dynamic braking valve to said electrical rheostat means for supplying air thereto;
control means on said brake application valve for moving said dynamic braking valve into first and second positions:

wherein said first position, said intake port is closed and said discharge and exhaust ports are opened for exhausting said second conduit means; and wherein said second position, said intake and said discharge ports are opened and said exhaust port is closed for establishing communication between said first and second conduit means for supplying air from said source to said electrical rheostat means to effect dynamic braking of said traction motor.

5. The invention as defined in claim 4 and further characterized by:

said brake application valve including a service braking valve having an intake port, a service port, and an exhaust port;
third conduit means connecting said source of air to said service braking valve intake port;
fourth conduit means connecting said service port to the wheel brake assembly of the vehicle service brakes;
said control means on said brake application valve being engaged to said service braking valve for moving same into first and second positions:
wherein said first position, said intake port is closed and said service and exhaust ports are opened for exhausting said fourth conduit means; and
wherein said second position, said intake and said service ports are opened and said exhaust port closed for establishing communication between said third and fourth conduit means for supplying air to said wheel brake assembly for application of said service brakes; said control means on said brake application valve comprising a brake treadle connected in tandem with said service braking valve in said dynamic braking valve for simultaneous operation.

6. The invention as defined in claim 6 and further characterized by:

said brake treadle being conditioned for selective movement among a disengaged position and first, second and third engaged positions whereby:
when said brake treadle is between said first and second engaged positions, said dynamic braking valve is in its second position for effecting dynamic braking and said service braking valve is in its first position; and,
when said brake treadle is between said second and third engaged positions, said dynamic braking valve is in its second position for effecting dynamic braking and said service braking valve is in its said second position for effecting application of the service brakes.

7. The invention as defined in claim 6 and further characterized by:

said brake treadle being in said first engaged position when said brake treadle is initially engaged;
said brake treadle being in said third engaged position when said brake treadle is fully engaged; and
said brake treadle being in said second engaged position when said brake treadle is engaged approximately midway between said first and third engaged positions.

* * * * *